United States Patent Office 3,025,553
Patented Mar. 20, 1962

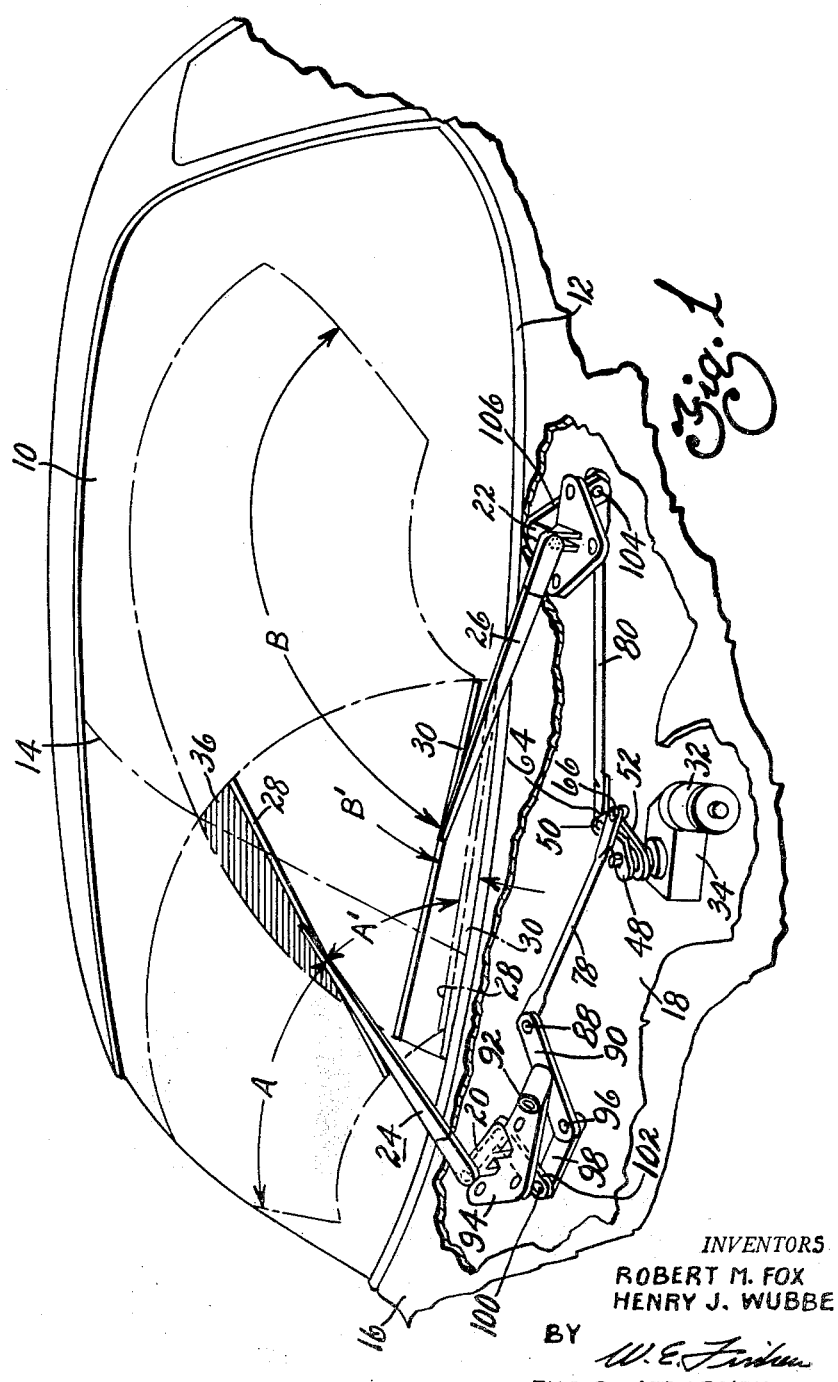

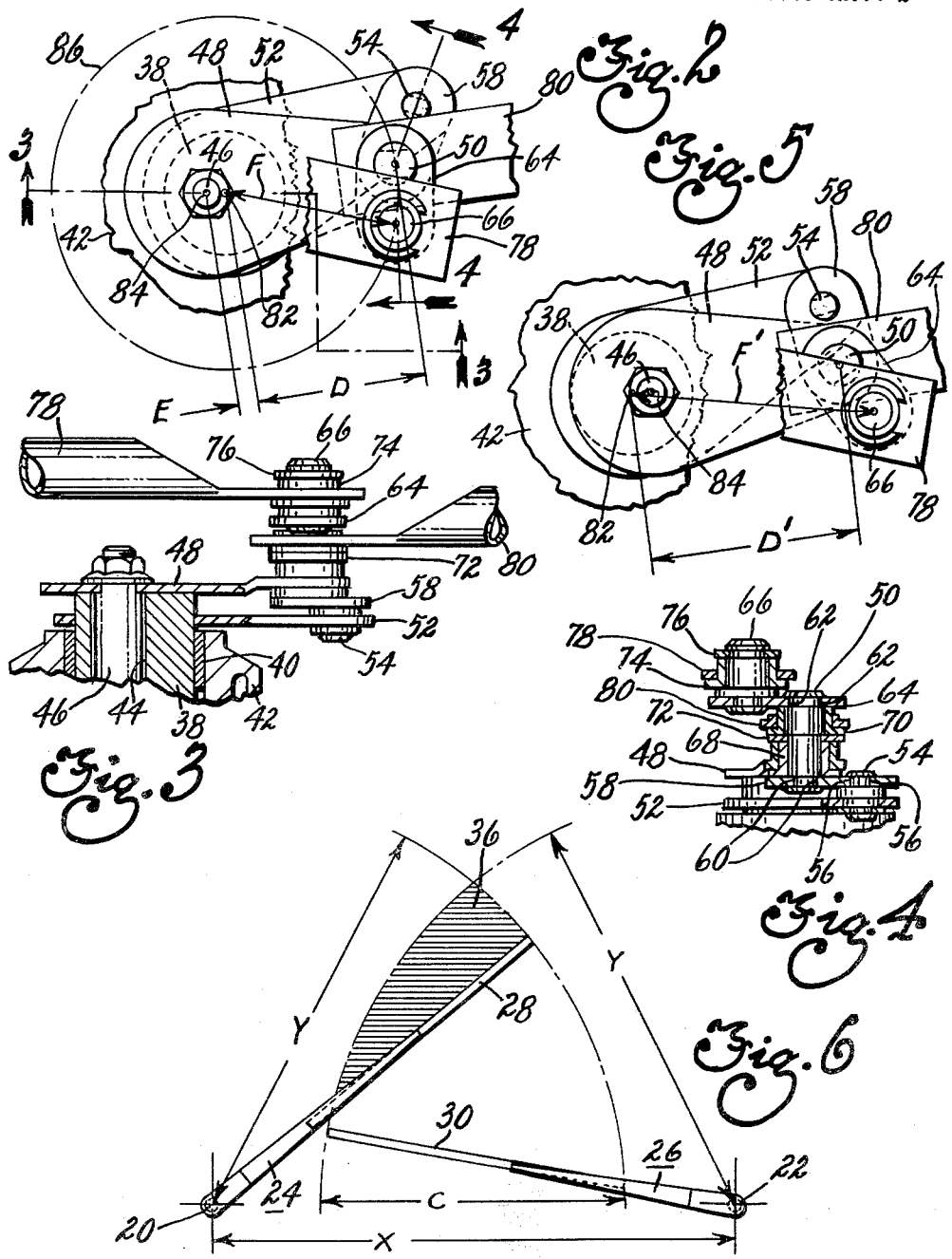

3,025,553
WINDSHIELD WIPER MECHANISM
Robert M. Fox, Detroit, and Henry J. Wubbe, Royal Oak, Mich., assignors to General Motors Corporation, Detroit, Mich., a corporation of Delaware
Filed Mar. 11, 1960, Ser. No. 14,443
11 Claims. (Cl. 15—250.16)

This invention pertains to windshield wiper mechanisms, and particularly to an improved drive mechanism for asymmetrically oscillated wiper blades having an overlapping wiping pattern adjacent their inboard stroke ends.

At the present time some vehicles are equipped with windshield cleaning mechanisms comprising a pair of asymmetrically operated wiper blades and drive means whereby the wiping patterns of the blades overlap adjacent their inboard stroke ends. Windshield cleaning mechanism of this type is disclosed in copending application Serial No. 756,097, filed August 20, 1958, in the name of Robert M. Fox et al. and assigned to the assignee of this invention, in which the overlap is approximately three and one-half inches. The present invention relates to a modified drive mechanism wherein the overlap is substantially equal to the wiper blade length, which, in some instances may be as long as twenty inches. Accordingly, among our objects are the provision of windshield wiping mechanism including a pair of asymmetrically oscillated wiper blades which substantially completely overlap each other in the parked position; the further provision of a variable throw crank assembly for actuating a pair of asymmetrically operated wiper blades which overlap substantially the length of the blade and which precludes interference between the blades; and the still further provision of a variable throw crank assembly of the aforesaid type including linkage means for obtaining differential parking angles of the two wiper blades.

The aforementioned and other objects are accomplished in the present invention by incorporating an offset crank assembly in the drive linkage in combination with link means for differentially varying the throw of the cranks during parking operation and designing the geometry of the drive linkage so as to preclude blade interference during running operation. Specifically, the wiper mechanism may be driven from any suitable power source, but, as disclosed, is driven by an electric motor having a variable throw crank assembly of the type disposed in copending application Serial No. 718,789, filed March 3, 1958, now Patent No. 2,985,024, in the name of Peter R. Contant et al. and assigned to the assignee of this invention. Thus, the motor drive includes eccentric means for shifting the axis of a rotary crank shaft after substantially arresting rotation of the crank shaft so as to increase the throw of the crank assembly to obtain depressed parking.

The rotary crank assembly comprises a shaft having a crank arm rigidly attached thereto and carrying a crank pin at its outer end. The shaft is eccentrically journalled in the rotatable hub of a driving member. A first link is rotatably journalled on the hub at one end, the other end of the first link being connected to a second link by a pivot pin. The pivot pin is rotatable relative to the first link while rigidly connected to the second link. The other end of the second link is rigidly connected to the crank pin on the crank arm. A third link also has one end rigidly connected to the crank pin on the crank arm and carries a crank pin adjacent its other end. The second and third links have a fixed angular relationship at all times. The third link constitutes the second crank arm of the offset assembly, the crank pins of which are located on the same side of the crank shaft.

The inner end of the connecting link for the bottom, or driver's, wiper blade is pivotally connected to the crank pin on the first crank arm, and the inner end of the connecting link for the top, or passengers, wiper blade is pivotally connected to the crank pin on the second crank arm. The connecting link for the driver's wiper blade is connected through a ball and socket joint to a crank arm attached to the pivot shaft on the driver's side of the vehicle. The connecting link for the passenger's blade is connected through a ball and socket joint to one end of a reversing link, or bellcrank, having a fixed intermediate pivot. The other end of the reversing link is rotatably connected to one end of a connecting arm, the other end of which is rotatably connected to a crank arm attached to the pivot shaft for the passenger's wiper blade. The reversing link on the passenger's side of the vehicle reverses the motion so that the two spaced-apart pivot shafts will be oscillated asymmetrically during rotation of the crank assembly.

The geometry of the linkage for the passenger's side is such that during running operation wherein the crank shaft rotates with the hub the wiping stroke will be throughout an angle of approximately 70°. The geometry of the drive linkage for the driver's wiper blade is such that during running operation the wiping stroke will be approximately 100°. By so proportioning the wiping strokes of the driver's and passenger's wiper blades, the wiping patterns of the blades will overlap adjacent their inboard stroke ends without interference.

During parking operation, rotation of the crank shaft is arrested while the hub continues to rotate thereby shifting the axis of the crank shaft. Since the second and third links have a fixed angular relationship during the rotation of the hub relative to the crank shaft, the throw of the crank pin carried by the third link, or second crank arm, is increased proportionally greater than the throw of the crank pin attached to the first crank arm. In this manner the driver's wiper blade is moved to the depressed park position in firm engagement with the lower reveal molding of the windshield throughout an angle of 10°, whereas the passenger's blade is moved throughout a parking angle of 40° on top of the driver's blade and in firm engagement therewith.

Further objects and advantages of the present invention will be apparent from the following description, reference being had to the accompanying drawings, wherein a preferred embodiment of the present invention is clearly shown, and wherein similar numerals depict similar parts throughout the several views.

In the drawings:

FIGURE 1 is a fragmentary perspective view, partly in section and partly in elevation, of a vehicle equipped with the overlapping wiper blade mechanism of this invention.

FIGURE 2 is a fragmentary view in elevation of the variable throw crank assembly in the running position.

FIGURES 3 and 4 are fragmentary sectional views taken along lines 3—3 and 4—4 of FIGURE 2, respectively.

FIGURE 5 is a fragmentary view in elevation of the rotary crank assembly in the parked position.

FIGURE 6 is a diagrammatic view of the overlapping blade system.

With particular reference to FIGURE 1, a portion of a vehicle is shown including a wrap around windshield 10 having a lower reveal molding 12. The center of the windshield is indicated by broken line 14. The vehicle also includes a cowl 16 and a firewall 18. A pair of spaced pivot shafts 20 and 22 project through the cowl 16, wiper arms 24 and 26 being drivingly connected to the pivot shafts 20 and 22, respectively. The wiper arms 24 and 26 are of the conventional type and thus include springs hinge connected inner and outer sections, the outer sections of which carry wiper blades 28 and 30, respectively.

An electric wiper 32 of the unidirectional direct current type, and a speed reducing and parking mechanism 34 are attached to the firewall 18 by any suitable means. As disclosed, the speed reducing and parking mechanism 34 is of the type disclosed in the aforementioned co-pending application Serial No. 718,789. The wiper arms 24 and 26 and the blades 28 and 30 carried thereby, are asymmetrically oscillated through drive means, to be described, so that the right hand, or passenger's blade, 28 has a running stroke of 70° depicted by the angle A, and the left hand, or driver's, blade 30 has a running stroke throughout an angle of 100° as depicted by the numeral B. The lengths (Y) of the arms and blades, and the distance (X) between the pivot shafts 20 and 22 is such that during running operation, the wiping paths of the wiper blades 28 and 30 overlap adjacent their inboard stroke ends in the area depicted by numeral 36 in the central position of the windshield 10. When the wiper blades 28 and 30 are moved to their depressed parked positions, the blade 28 overlies substantially the entire length (c) of the blade 30 as depicted by the dotted line position in FIGURE 1. In the parked position, the blade 30 firmly engages the lower reveal molding 26 and the blade 28 firmly engages the blade 30. The parking angle of the blade 30 from the inboard stroke end to the depressed parked position is 10°, whereas the parking stroke of the blade 28 from its inboard stroke end into firm engagement with the blade 30 is 40°.

With reference to FIGURES 2 through 4, the electric motor 32 rotates a driving member having a cylindrical hub 38 journalled for rotation by sleeve bearing 40 in a housing 42. The hub 38 has an eccentric through bore 44 within which a shaft 46 is journalled. During running operation, the shaft 46 is connected to rotate with the hub 38 about the axis thereof in accordance with the disclosure and teachings of the aforementioned co-pending application Serial No. 718,789. The shaft 46, constituting a driven element, has a crank arm 48 drivingly connected thereto and rotatably supports a crank pin 50 adjacent its outer end. A link 52 is journalled on the outer periphery of the hub 38 and has a crank pin 54 rotatably supported adjacent its outer end. The crank pin 54 is formed with a pair of diametrically opposed flats 56 extending through a complementary opening in a second link 58 whereby the the link 58 is drivingly connected to the crank in 54. The other end of the link 58 has an opening receiving a pair of flats 60 on the crank pin 50 whereby the link 58 is also drivingly connected to the crank pin 50. The crank pin 50 has a second pair of flats 62 received in a complementary opening in a third link, or crank arm, 64 whereby the link 64 is drivingly connected to the crank pin 50. The link 64 has a crank pin 66 rigidly connected thereto adjacent its outer end. The crank pin 50 carries a pair of bushings 68 and 70 spaced apart by a washer 72. The crank arm 48 is rotatably journalled on the bushing 68. The crank pin 66 carries a bushing 74 held in place by a snap ring 76 which engages an arcuate groove in the crank pin. One end of a connecting link 78 is journalled on the bushing 74 and one end of a connecting link 80 is journalled on the bushing 70.

Since crank arm 64 and link 58 are rigidly drivingly connected to the crank pin 50, the angular relationship, or angular orientation of the links 58 and 64 remains fixed at all times as depicted in FIGURES 2 and 5. The center, or axis of rotation, of the driving member 38 is depicted by numeral 82 in FIGURES 2 and 4, and the center of the shaft 46 is depicted by numeral 84. During running operation, the shaft rotates with the hub 38 about the axis 82, and as seen in FIGURE 2, the crank pins 50 and 66 are equally radially spaced from the axis 82 and rotate in a path as indicated by the circle depicted by numeral 86.

Referring to FIGURE 1, the inner ends of links 78 and 80 are connected to the crank assembly as described hereinbefore. The outer end of the link 78 is pivotally connected at 88 to one end of a reversing link 90 pivotally supported intermediate its ends by a pin 92 journalled in a bracket 94. The other end of the reversing link 90 is pivotally connected at 96 to one end of a connecting arm 98, the other end of which is pivotally connected at 100 to one end of a crank, or drive arm, 102, the other end of which is rigidly connected to the right hand pivot shaft 20.

The outer end of the connecting link 80 is pivotally connected at 104 to one end of a crank, or drive arm, 106. The other end of the drive arm 106 is drivingly connected to the left hand pivot shaft 22. As alluded to hereinbefore, during running operation of the wiping mechanism, the geometry of the right hand linkage assembly for actuating shaft 20 is such that during rotation of the crank pin 66 in the circle 86, the wiper arm 24 and the blade 28 are oscillated throughout an angle A of 70°. On the other hand, the geometry of the left hand linkage is such that during rotation of the crank pin 50 in the circle 86, the arm 26 and the blade 30 are oscillated throughout an angle B of 100°. The wiper blades 28 and 30 are shown at their inboard stroke end running positions in FIGURE 1.

During parking operation, which is automatically effected upon manual operation of the wiper control switch to the "off" position, rotation of the shaft 46 is arrested with the position of the crank pins 50 and 66 as depicted in FIGURE 2, namely at their inboard stroke end running positions. The driving member and hub 38 continue to rotate, which rotation throughout 180°, shifts the position of the shaft 46 from one side of the center 82 of the hub 38 to the other side thereof, as seen in FIGURE 5. By shifting the position of the shaft 46, the radial distance between the center of crank pin 50 and the axis 84 is increased from the distance D as seen in FIGURE 2 to the distance D' as seen in FIGURE 5, the distance D' being equal to the distance D plus twice the distance E which is the distance between the centers 84 and 82 as seen in FIGURE 2. This increase in the radius, or throw, of the crank pin 50 is sufficient to move the wiper blade to a depressed parked position in engagement with the lower reveal molding 12 as shown in dotted lines in FIGURE 1 throughout an angle B' which angle is 10°.

During radial outward movement of the crank pin 50 due to relative rotation between the hub 38 and the shaft 46, the link 58 rotates about the pin 50. Since the link, or crank arm, 64 is likewise drivingly connected to the pin 50, and since links 58 and 64 have a fixed angular relation at all times, the link 64 likewise rotates about pin 54 thereby increasing the radial distance of the crank pin 66 from the axis 82 of the hub 38 from the distance F in FIGURE 2, to the distance F' in FIGURE 5. The linkage 58 and 64 multiplies the movement of the crank pin 66, so that the radial distance F' is equal to the distance F plus substantially four times the distance E. Thus, during parking operation, the throws of the cranks are differentially varied. In this manner, the wiper blade 28 is moved to a depressed parked position on top of, or overlapping, blade 30 throughout an angle of substantially 40°. When the blades 28 and 30 are in the depressed parked position, as indicated by the dotted lines in FIGURE 1, the blade 28 substantially completely overlaps the blade 30.

During running operation of the wiper blades, the driver's blade 30 traverses the overlapped area 36 on the windshield substantially ahead of the wiper blade 28. However, oscillation of the wiper blades is substantially synchronized since blades 28 and 30 arrive at both their inboard and outboard stroke end running positions substantially simultaneously. In this manner, interference between the blades 28 and 30 is precluded. During parking operation, the blade 30 moves into engagement with the cowl 16 before blade 28 engages the blade 30. When the wiper motor is initially energized, the wiper blade 28 moves out of engagement with the wiper blade 30 during rotation of the hub 38 relative to the shaft 46 from the position of FIGURE 5 to the position of FIGURE 2 whereat the shaft 46 is again drivingly connected for rotation with the hub 38 about its axis 82.

While the embodiment of the invention as herein disclosed constitutes a preferred form, it is to be understood that other forms might be adopted.

What is claimed is as follows:

1. Cleaning mechanism for a vehicular windshield including, a pair of oscillatable wiper blades, said wiper blades being movable throughout a running stroke and to depressed parked positions beyond the inboard stroke end limits of said running strokes, the arrangement being such that one blade overlaps substantially the entire length of the other blade in their depressed parked positions, means for imparting asymmetrical oscillation to said wiper blades throughout running strokes of different angular extent, and means for moving said wiper blades through parking strokes of different angular extent to their depressed parked positions.

2. Cleaning mechanism for a vehicular windshield including, a pair of oscillatable wiper blades, said wiper blades being movable throughout running strokes and to depressed parked positions beyond the inboard stroke end limits of their running strokes, said wiper blades being arranged to have overlapping paths adjacent the central portion of said windshield during their running strokes and having their inboard stroke end limits angularly offset with respect to each other, the arrangement being such that one blade overlaps substantially the entire length of the other blades in their depressed parked positions, means for imparting asymmetrical oscillation to said wiper blades throughout their running strokes, and means for moving said wiper blades throughout parking strokes of different angular extent to their depressed parked positions.

3. Cleaning mechanism for vehicular windshields including, a pair of oscillatable wiper arms, a wiper blade carried by each arm, said wiper blades being movable throughout running strokes and to depressed parked positions beyond the inboard stroke end limits of their running strokes, the arrangement being such that one blade overlaps at least half the length of the other blade in their depressed parked positions, means for imparting asymmetrical oscillation to said wiper arms and blades throughout running strokes of different angular extent, and means for moving said wiper arms and blades through parking strokes of different angular extent to their depressed parked positions.

4. Cleaning mechanism for a vehicular windshield including, a pair of spaced pivot shafts, a wiper arm drivingly connected to each pivot shaft, a wiper blade carried by ecah wiper arm, said wiper blades being movable throughout running strokes and to depressed parked positions beyond the inboard stroke end limits of their running strokes, the arrangement being such that one blade overlaps more than half the length of the other blade in their depressed parked positions, means for imparting asymmetrical oscillation to said pivot shafts to oscillate said wiper blades and arms throughout running strokes of different angular extent, and means for oscillating said pivot shafts through parking strokes of different angular extent to move said wiper arms and blades to their depressed parked positions.

5. A variable throw crank assembly including, a first rotary crank, a second rotary crank operatively connected to said first rotary crank so as to be rotated thereby, means operable to rotate said cranks while maintaining the throws of said cranks substantially constant, and means operable to differentially vary the throws of said cranks.

6. A variable throw crank assembly including, a first rotary crank, a second rotary crank operatively connected to said first crank so as to be rotated thereby, means operable to rotate said cranks and maintain the throws of said cranks substantially constant, and means for arresting rotation of said cranks and thereafter differentially varying the throws of said cranks.

7. A variable throw crank assembly including, a first rotary crank arm carrying a first crank pin, a second rotary crank arm operatively connected to said first crank pin so as to be rotated thereby, said second crank arm carrying a second crank pin, means operable to rotate said first and second crank arms while maintaining the throws of said first and second crank pins substantially constant, and means operable to differentially vary the throws of said first and second crank pins.

8. A variable throw crank assembly including, a rotary driving member, a driven element eccentrically supported for rotation by said driving member, a first rotary crank drivingly connected to said driven element, a second rotary crank operatively connected to said first crank so as to be driven thereby, and means operable to rotate said driving member to rotate said driven element about the axis of said driven member, said first and second cranks being driven by said driven element with the throws thereof maintained substantially constant, the throws of said cranks being differentially varied upon rotation by said driving member and said driven element.

9. A variable throw crank assembly including, a rotatable driven member having an eccentric through bore, a driven element rotatably journalled in said eccentric through bore, a first rotary crank drivingly connected to said driven element, a second rotary crank operatively connected to said first crank so as to be driven thereby, and means for imparting rotation to said driving member to rotate said driven element and said cranks while maintaining the throws of the said cranks substantially constant, the throws of said cranks being differentially varied upon relative rotation between said driving member and said driven element.

10. A variable throw crank assembly including, a rotatable driving member having a cylindrical periphery and an eccentric through bore, a driven element journalled in the eccentric through bore of said driving member, a first crank arm rigidly connected to said driven element and carrying a first crank pin, a second crank arm rigidly connected to said first crank pin so as to be driven thereby and carrying a second crank pin, a first link journalled on the cylindrical periphery of said driving member and rotatably carrying a pin at its outer end, a second link drivingly connected to the pin of the first link and drivingly connected to the first crank pin whereby the angular orientation of said second link and said second crank arm remains fixed at all times, and means for imparting rotation to said driving member to rotate said first and second crank arms while the throws of said first and second crank pins are maintained substantially constant, the throw of said first crank pin being varied upon relative rotation between said driving member and said driven element, the throw of said second crank pin being varied to a greater extent than the throw of said first crank pin due to pivotal movement of said second link and said second crank arm during relative rotation between said driving member and said driven element.

11. A variable throw crank assembly including, a rotatable shaft, a first crank arm attached to said shaft having a first crank pin journalled adjacent to its outer end, a rotatable member, said shaft being eccentrically journalled in said rotatable member, a first link journalled on said rotatable member and having a pin journalled adjacent its outer end, a second link rigidly connected between said pin and said first crank pin, a second crank arm rigidly connected to said crank pin and oriented at an angle to said second link, said second crank arm having a crank pin rigidly connected thereto adjacent its outer end, the angular relation between said second link and said second crank arm being fixed, whereby relative rotation between said rotatable member and said shaft will differentially vary the throws of the first and the second crank pins.

References Cited in the file of this patent

UNITED STATES PATENTS

| | | |
|---|---|---|
| 2,832,225 | Hart | April 29, 1958 |
| 2,866,344 | Reese | Dec. 30, 1958 |
| 2,959,968 | Gute et al. | Nov. 15, 1960 |